United States Patent [19]

Engelbrecht et al.

[11] 4,448,067
[45] May 15, 1984

[54] METHOD AND APPARATUS FOR DETERMINING THE INJECTED FUEL QUANTITY IN INTERNAL COMBUSTION ENGINES

[75] Inventors: Hans-Christian Engelbrecht, Stuttgart; Helmut Kniss, Waiblingen; Wolf Wessel, Oberriexingen, all of Fed. Rep. of Germany

[73] Assignee: Robert Bosch GmbH, Stuttgart, Fed. Rep. of Germany

[21] Appl. No.: 421,665

[22] Filed: Sep. 22, 1982

[30] Foreign Application Priority Data

Jul. 2, 1982 [DE] Fed. Rep. of Germany ....... 3224742

[51] Int. Cl.³ .......................................... G01M 15/00
[52] U.S. Cl. ..................................... 73/119 A; 73/113
[58] Field of Search ....................... 73/119 A, 113, 114

[56] References Cited

U.S. PATENT DOCUMENTS 4,130,013 12/1978 Bailey et al. ...................... 73/119 A
4,145,932 3/1979 Pagel ............................ 73/119 A X
4,178,798 12/1979 Wessel .................................. 73/113

Primary Examiner—Gerald Goldberg
Assistant Examiner—E. Harding
Attorney, Agent, or Firm—Edwin E. Greigg

[57] ABSTRACT

A method and apparatus for determining the injected fuel quantity in internal combustion engines having self-ignition are proposed. A performance graph is prepared which includes the injected fuel quantity per stroke in accordance with the injection duration, with the rpm as a parameter. In order to avoid a fictive 0 point, the injection duration is shortened by a predetermined period of time and multiplicatively linked with an rpm signal, while linear rpm correction curves having a dependency of the rpm voltage on the injection duration can be assumed. At the output of an integrator by means of a sample and hold circuit, an injection quantity signal is produced whenever the rpm signal ($U_n$) is supplied to the integrator for the integration process and the duration of the integration is determined on the basis of the injection duration signal (SD).

16 Claims, 6 Drawing Figures

METHOD AND APPARATUS FOR DETERMINING THE INJECTED FUEL QUANTITY IN INTERNAL COMBUSTION ENGINES

BACKGROUND OF THE INVENTION

The invention is based on a method and an apparatus for determining the injected fuel quantity in internal combustion engines, as generally defined hereinafter. Measures for ascertaining the injection quantity in Diesel engines, that is, internal combustion engines having self-ignition, are known in many forms. One of the known possibilities encompasses a diagnostic device (German Offenlegungsschrift No. 21 43 676), which has a piezoelectric pressure measuring transducer in the pressure line from a fuel pump to the injection nozzle, the electrical output signals of the transducer then being used for indicating the instant of injection, injection pressure or injection frequency. In a similar manner, in a further known apparatus (U.S. Pat. No. 3,511,088), a piezoelectric converter is used, in order to attain, among other things, data as to the quantity of fuel delivered to the combustion chambers of an internal combustion engine. In all the known apparatus, the criterion is pressure and the variation of this pressure in the fuel line leading to the injection valves. This may lead to disadvantages because it has been found that the evaluation of the individual pressure signals cannot always produce satisfactory results and, further, because errors in measurement, caused for example by the effects of resonance in the pressure lines or by other stray interference, are unavoidable.

On the other hand, particularly precise ascertainment of the injection quantity in internal combustion engines, and in particular in Diesel engines, is increasingly desirable, first because such values are increasingly used for regulating purposes in regulating the onset of injection of an injection nozzle or the onset of supply by the fuel pump, but also in order to be able to furnish a load signal for exhaust gas recirculation systems. Such load signals are indispensable for satisfactory control of the recirculated quantity of exhaust gas in Diesel engines; and finally, signals proportional to the injected fuel quantity are also required for fuel consumption gauges.

OBJECT AND SUMMARY OF THE INVENTION

The method and apparatus according to the invention for determining the injected fuel quantity have the advantage that particularly precise measurement results relating to the injected fuel quantity can be attained. Thus highly precise injection quantity signals can be supplied to the regulating devices which are coming into increasing use, even for the operation of Diesel engines, particularly on an electrical and electronic basis, and exhaust gas recirculation systems can also be guided precisely with respect to the particular point of the Diesel engine at a given time, in order to obtain optimal results.

In order to ascertain the injected fuel quantity, data relating to the injection duration SD and to the rpm n of the engine are required, and nothing more; thus the expense of obtaining precise results when modern circuitry and sensor technology are used is comparatively low, and the further advantage is also attained that the system according to the invention can be adapted to every engine type. All that is required is to prepare a corresponding performance graph for the particular engine, which indicates the dependency of the injected fuel quantity over the duration of injection, in accordance with the rpm of the engine.

The processing of the engine parameters detected in order to ascertain the injection quantity, that is, injection duration and rpm, can be effected in analog circuitry, the final result being a correspondingly analog voltage for the fuel quantity; however, it is also possible to perform this operation digitally, evaluating a corresponding and possibly digitally stored performance graph, possibly also using digital interpolation switches such as are known per se.

The invention will be better understood and further objects and advantages thereof will become more apparent from the ensuing detailed description of preferred embodiments taken in conjunction with the drawings.

DESCRIPTION OF THE PREFERRED EMBODIMENTS

The fundamental concept of the present invention is a result of the awareness that as tests on corresponding engines have shown, there is a relationship between the injection duration SD, the rpm n and the fuel quantity $Q_K$. It is therefore possible to obtain a signal which is proportional to the injected fuel quantity and is furthermore particularly precise, by means of linking an rpm-proportional voltage with the opening time of the injection nozzle in internal combustion engines, specifically Diesel engines.

Figure 1:
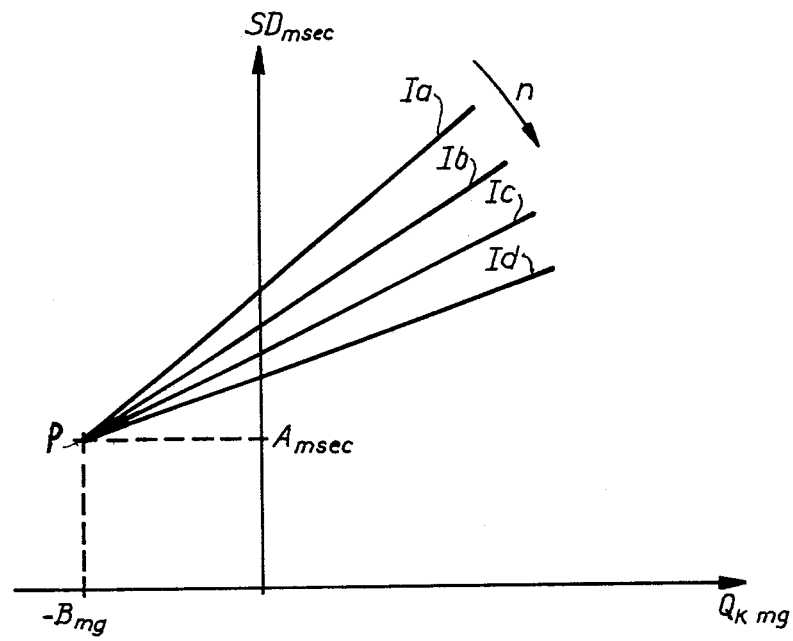
FIG. 1 shows a performance graph in the form of a diagram, indicating the dependency of the injection quantity on the injection duration and the rpm as parameters.

Tests of the engine have produced the performance graph shown in FIG. 1, which illustrates the dependency of the injection quantity $Q_K$, for instance in milligrams per stroke, in accordance with the injection duration SD, shown in msec, with various curves Ia through Id being shown, each one representing a constant rpm n as a parameter. The performance graph shown in FIG. 1 also shows that as indicated at P a so-called fictive zero point of the performance graph is produced which is located at $SD = A_{msec}$ and at $Q_K = -B$ mg. Therefore in order to be able to operate in a useful physical range and to evaluate such a performance graph, the dimension $A_{msec}$ must be subtracted from the injection duration, as will be described in greater detail below. The result then is an effective injection duration $SD_{eff}$ for further processing.

Figure 2A:
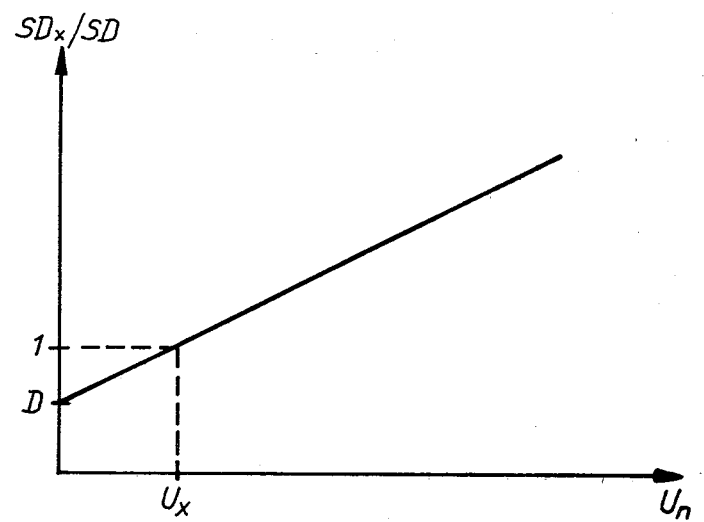
FIG. 2a shows a linear rpm correction curve of the injection duration via an rpm-proportional voltage.
Figure 2B:
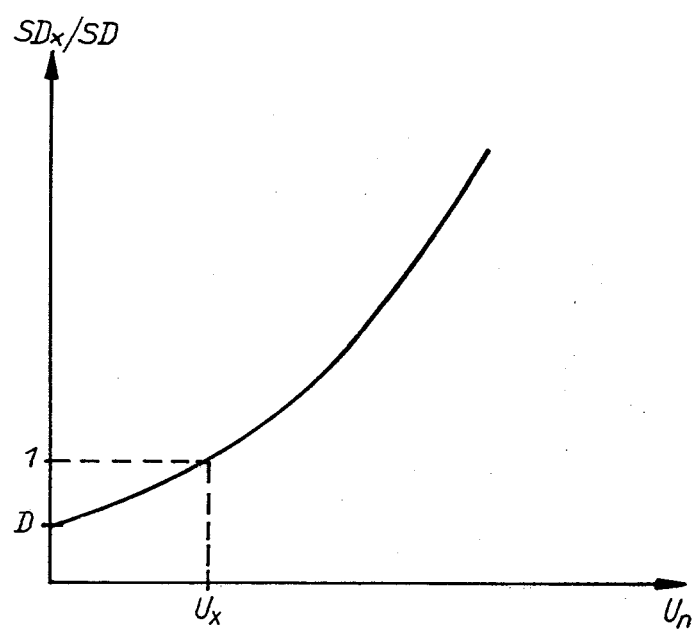
FIG. 2b shows a non-linear rpm correction curve of the injection duration via an rpm-proportional voltage.

The injection duration $SD_{\text{eff}}$ associated at a given rpm n with a predetermined fuel quantity has to be corrected in accordance with rpm, and for this purpose one can make use of the rpm correction curves shown in FIGS. 2a and 2b. For normative purposes, the injection duration SDx is used, which at a fixed rpm x indicates the dependency on the given injection quantity at that time. FIG. 2a shows the dependency of an rpm-proportional voltage Un on the normalized injection duration SDx/SD, which in the simplest case varies linearly. Alternatively, it is also possible to use a use a non-linear or rpm correction curve as shown in FIG. 2b, which is possible by means of corresponding changes in circuitry in processing, which will be discussed in greater detail below; normally, however, the use of a non-linear correction curve is not required.

It is therefore possible, as shown in the performance graph of FIG. 1, to detect the quantity of fuel injected per stroke by means of detecting a respective performance graph for each particular engine type. In order to realize the method according to the apparatus, it is also possible to store the obtained values in a digital memory, for instance a fixed-value memory, from which the corresponding rpm-corrected injected fuel quantities can then be interrogated by means of an appropriate addressing of the performance graph with digital words relating to the rpm at a given time and the injection duration at a given time.

However, in the present invention it is preferred that processing of the rpm and injection duration signals obtained by appropriate sensors be effected in analog form in order to represent the injection quantity $Q_K$ as an analog output voltage of the circuit apparatus to be explained in greater detail below.

Figure 3:
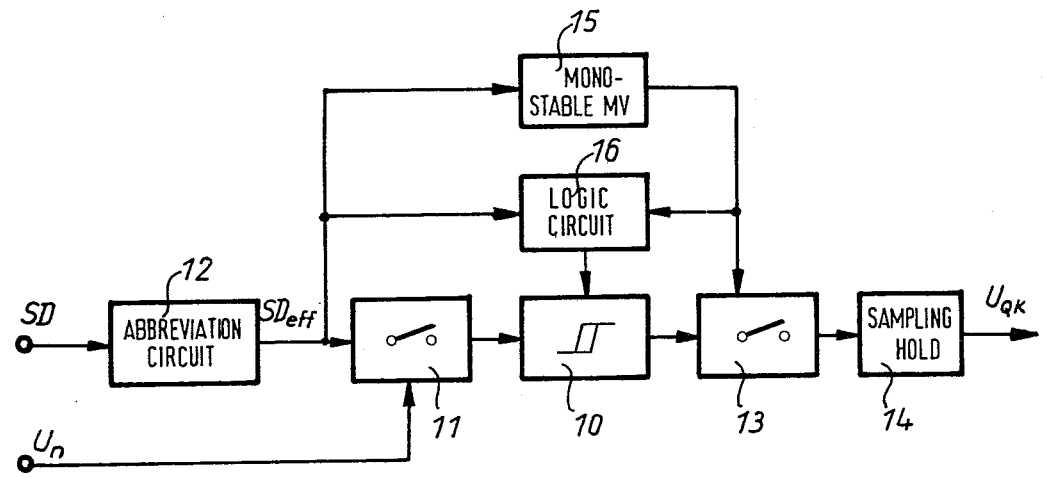
FIG. 3 shows a first exemplary embodiment of the invention in the form of a block circuit diagram for ascertaining an output voltage proportional to the injection quantity, in this case in analog circuitry.

In the exemplary embodiment of a processing circuit according to the invention shown in FIG. 3, the primary component is an integrator 10, to which the rpm-proportional voltage Un is applied via an electric switch 11 for the duration of the effective injection duration $SD_{\text{eff}}$. The switch 11 is therefore clocked by the effective injection duration $SD_{\text{eff}}$, and in order to obtain the effective injection duration, an abbreviation or delaying circuit 12 is provided which shortens the normal injection duration signal SD generated by a suitable sensor by the amount of the correction value of $A_{\text{msec}}$ mentioned above. What is then obtained, depending upon the length of the effective injection duration $Sd_{\text{eff}}$ or upon the magnitude of the rpm voltage Un at the output of this integrator 10, is a voltage which is proportional to the injection quantity $Q_K$. This integrator output voltage then travels via a further electric switch 13 to a sample and storage circuit 14. It is then also necessary to determine the duration over the course of which the electric switch 13 is closed for sampling the $Q_K$ voltage value from the output of the integrator 10, this determination being made, for example, with the aid of a suitable monostable multivibrator 15. The monostable multivibrator 15 is efficaciously switched by the trailing edge of the SD signal. After the elapse of the effective duration time $SD_{\text{eff}}$ and the sampling time relating to the sample and hold or storage circuit, the integrator 10 is then reset by a suitable discharge logic element 16.

At the output of the sample and hold circuit 14, the voltage signal $U_{QK}$, which is proportional to the injection quantity, is then obtained, which is determined presuming a linear rpm correction curve, from the following equation:

$$U_{QK} = E \cdot V/mg \cdot \left( \frac{d_{QK} \, mg}{dSD \, msec} \right)\bigg|_{X_{\min}-1} \cdot (SD - A \, msec) \cdot$$

$$(D + (1-D) \cdot \frac{Un}{U} + (-Bmg)$$

Figure 4:
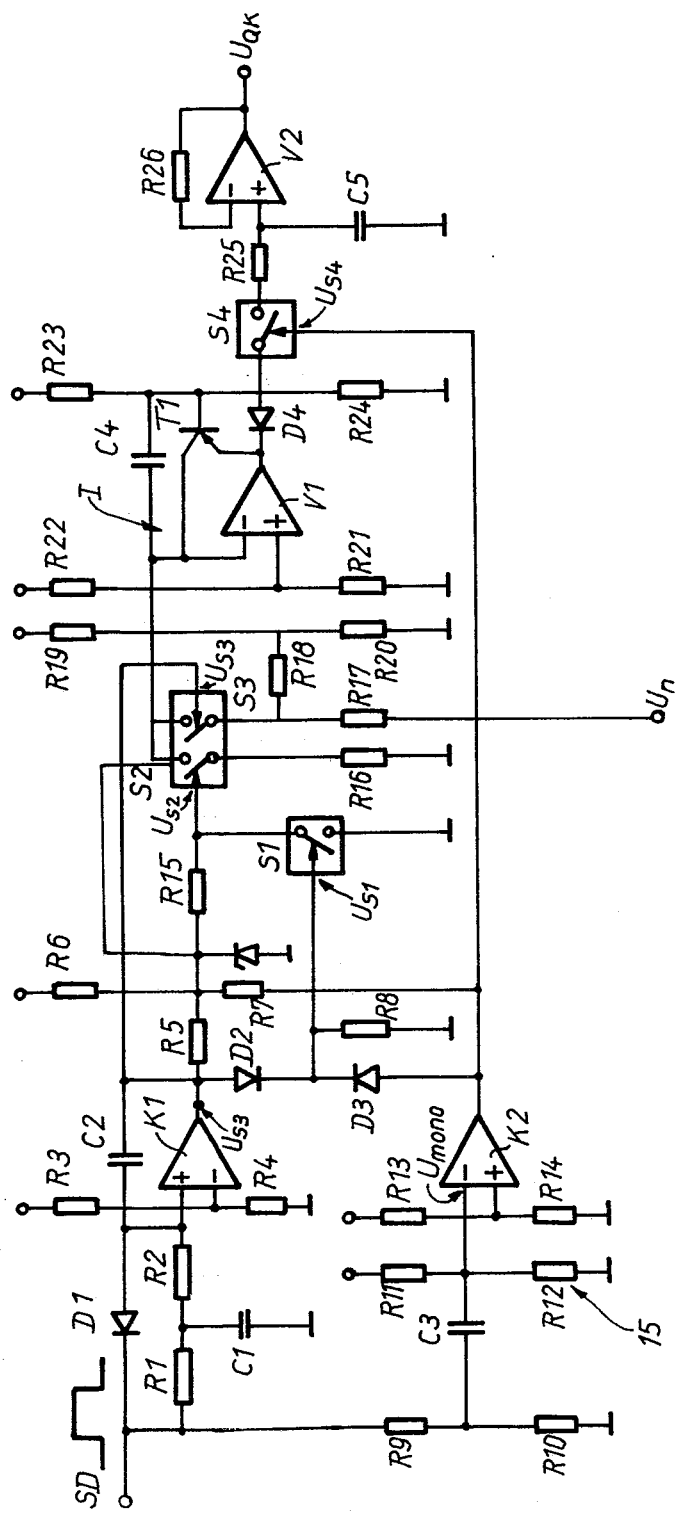
FIG. 4 is a detailed circuit diagram corresponding to the block circuit diagram of FIG. 3.
Figure 5:
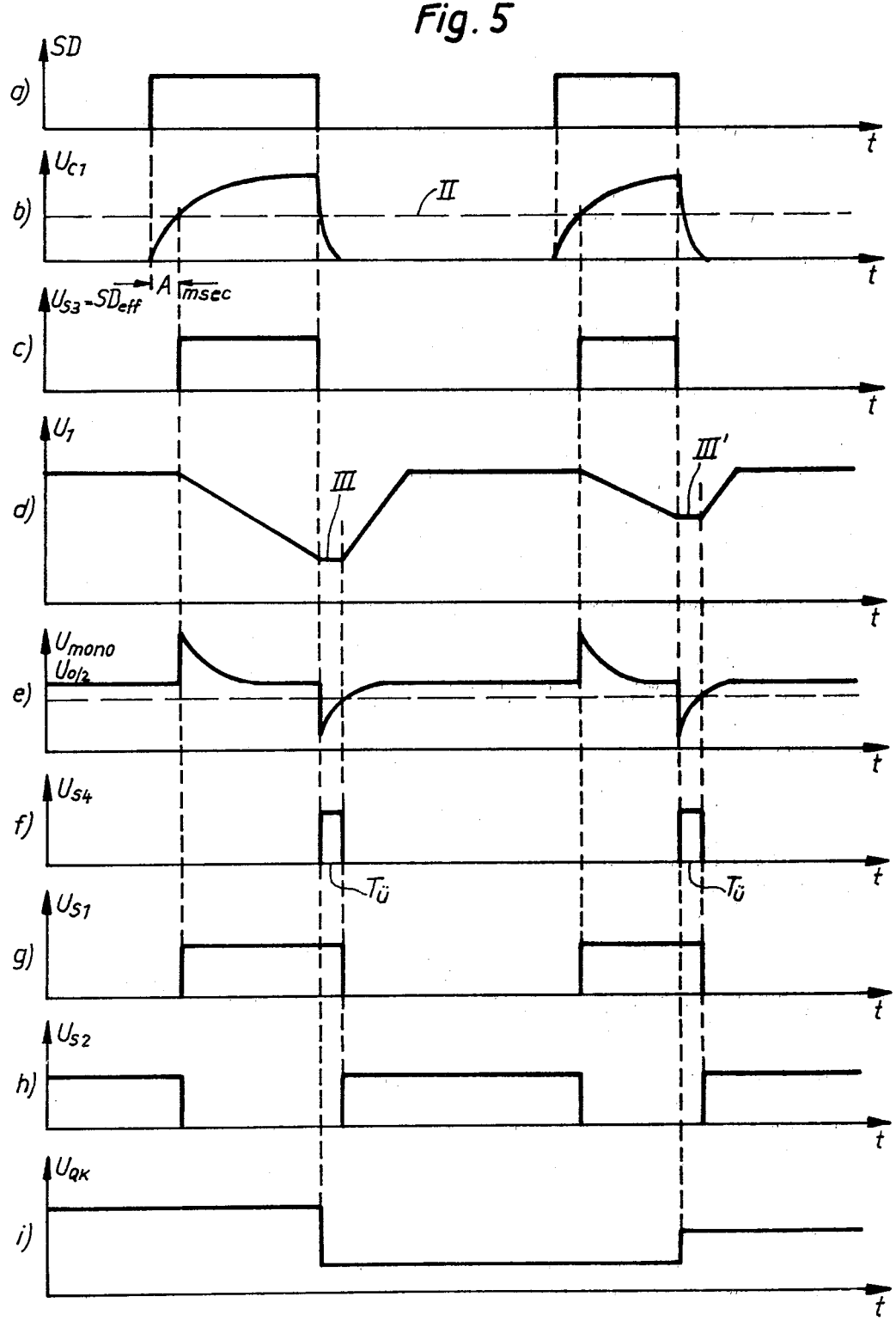
FIG. 5, at (a) through (i), shows curves in the form of pulse diagrams for voltages or operating parameters of the internal combustion engines over time, such as are produced at various switching points in the illustrated exemplary embodiment.

A preferred exemplary embodiment for generating an analog injection quantity voltage $U_{QK}$ by analog means will now be described in detail, referring to the detailed circuit diagram in FIG. 4 in combination with the pulse diagrams of FIG. 5. It should be noted that the following description of circuitry and function has its most important aspect in terms of the invention in the functional course of the individual processing steps. It will be understood that for the electronic components which will now be described explicitly, other components having correspondingly effective functional courses can also be used in the same manner in the circuit.

The normal injection signal SD obtained by suitable sensor means may be derived directly in the form of an electrical signal with a predetermined period duration from an electronic preparation circuit for the injection process; however, it is also possible to detect the injection onset and injection end at the injection nozzle mechanically or electrically, or to ascertain the course of the injection duration with the aid of the course of pressure in the lines, or to use threshold values of the pressure gradients for injection onset and injection end. This normal injection signal SD travels via a resistor-capacitor combination to one input (the positive input) of a comparator or differential amplifier K1, while a voltage determined by the voltage divider R3, R4 is applied to the other input, that is, the negative input of the comparator K1. The shortening of the injection duration signal SD by a predetermined initial value of $A_{\text{msec}}$ at a given time is then effected in that as the SD increases, first the capacitor C1 connected to ground from the linking point of the two resistors R1, R2 is charged. Since the injection signal duration SD has a constant amplitude at any given time, the delay period relating to the further travel of the SD signal and provided at a given time by the charging of the capacitor C1 is constant and by means of the appropriate dimensioning of R1 and C1 corresponds to the desired delay period $A_{\text{msec}}$. The threshold voltage determined by the voltage divider resistors R3, R4 is attained after the elapse of $A_{\text{msec}}$ at the other input of the comparator K1, the output of which then switches over from low to high, as a result of which the comparator output voltage $U_{S3}$ shown in the diagram of FIG. 5 at (c) corresponds to the effective injection duration $SD_{\text{eff}}$. The pulse diagram (b) shows the increase in capacitor voltage $U_{C1}$ with the constant threshold voltage II, and when this threshold voltage is exceeded the comparator K1 switches over. In the diagram (a) of FIG. 5, the output injection duration signal SD is shown.

As soon as the injection duration signal SD switches back to low, the capacitor C1 is very rapidly discharged by way of the parallel circuit of R1 and R2 produced by the conductively switched diode D, so that at practically the same instant the output of the comparator K1 also follows the trailing edge of the injection duration signal SD.

The output of the comparator K1 is connected to the switch S3 via the connecting line L1, and the switch S3 is therefore closed until such time as the output of K1 carries a high voltage signal corresponding to the curve $U_{S3}$. The rpm voltage Un then travels via the switch S3 to the integrator I, which may by way of example be embodied by an operational amplifier V1 having a capacitor C4 connecting its input and output; this element thus represents a so-called Miller integrator. The diode D4 also shown at the output of the operational amplifier V1, having a transistor T1 connecting the output and input via its switching path, serves solely to prevent the integrator from entering a saturated condition. The integrator I is embodied such that beginning with the voltage value established at the voltage divider R23, R24 disposed at its output it integrates linearly downward, depending upon how long the effective injection duration $SD_{eff}$ closes the switch S3. In a corresponding manner, at a constant rpm voltage Un, downward integration is performed to various voltage values U1, as shown in the curve of FIG. 5 at (d); the same is true if the effective injection duration $SD_{eff}$ is constant and the rpm voltage Un varies. It will be appreciated that both parameters, that is the magnitude of the rpm voltage Un and the effective injection duration act in a superimposed manner upon the signal formation at the output of the integrator I, and depending upon the assumption of linear or non-linear rpm correction curves, further appropriate non-linearities can also be taken into consideration, for example in supplying the rpm voltage Un.

The sample and hold voltage which follows the integrator I is formed by an operational amplifier V2 which is fed back via the resistor R26; the other, signal-carrying input of the operational amplifier V2 is furnished with the capacitor C5 as a memory and is connected to ground. It is important that the sample and hold circuit is acted upon by the output of the integrator I only when the integrator has attained its given final value predetermined by the end of the effective injection duration $SD_{eff}$; these end values being shown in the form of narrow plateaus marked III and III' in FIG. (d). The transfer switch S4 for transferring the final integrator value to the sample and hold circuit is triggered by the trigger circuit having a multivibrator shown in FIG. 4 at 15 and including a further comparator K2. The instantaneous final voltage value U1 is transferred via the closed switch S4 via the sample zone (R25, C5) to the hold zone (V2). Upon the next closure of the switch S4, the next voltage value of the voltage U1, in this case the amplitude indicated by plateau III' then reaches the sample and hold circuit 14. The sampling time, corresponding to the closing time of the switch S4 as indicated in FIG. 5 at (f) by the rectangular pulses of the voltage $U_{S4}$ is then generated as follows: The injection duration signal SD or the effective injection duration signal $SD_{eff}$ (both signals can be used, because the critical point here is only the trailing edge, which is unchanged in both signals) is divided downward via a voltage divider R9, R10, differentiated via the RC member comprising C3 and R12 and superimposed at the voltage divider comprising R11 and R12 (see FIG. 4) with half the operating voltage, by way of example. The signal thus obtained reaches one input, in this case the negative input, of the comparator K2, while a voltage is applied to the other input (positive input) via the voltage divider comprising R13 and R14; this voltage may be smaller than that mentioned above, that is, smaller than half the operating voltage. The function of the circuit can be understood by referring to the curve shown in (e) of FIG. 5. If the injection duration signal SD or $SD_{eff}$ is set to "low", then half the operating voltage is applied to the negative input of the comparator K2 and the output of the comparator K2 likewise is at a zero or log 0, because a voltage value of less than half the operating voltage is applied at the positive input. If the SD signal increases, then the result at the negative input of the comparator K2 is a voltage jump in the positive direction, but as a result of this the fundamental voltage division at comparator K2 does not vary. The components connected to the negative input of the comparator K2, as a whole, have the characteristic of a monostable multivibrator, so that the voltage curve shown at (e) of FIG. 5 is also designated Umono. Only with the trailing edge of the SD signal, or in other words when the SD signal drops back to a low level, is there a switchover of the comparator output to high for the short period during which the signal at the negative input of K2 is more negative than the signal at the positive input, or in other words for the short period when the voltage falls below the threshold predetermined by the voltage divider R13, R14. The comparator output remains at "high" until such time as the voltage Umono again exceeds the threshold, which can be determined by the dimensioning of the elements C3, R12, as a result of which the comparator output is reset back to a low value. The result is then the short sampling time Tü, corresponding to the voltage curve $U_{S4}$, during which the integrator output is switched to the sample and hold circuit.

During this period, the output of the integrator must not be permitted to vary; a discharge of the capacitor C4 can thus be permitted only after the elapse of the sampling time Tü.

The discharge of the capacitor C4 of the Miller integrator in the integrator I is effected to ground via the closed switch S2 and the resistor R16 switched in series with it. As mentioned, the switch 2 is allowed to be closed only if neither the switch S3 nor the switch 4, which may be of any desired embodiment including electronic, is closed. To this end, a logical linkage circuit is provided, which is embodied such that it processes the output signals of the comparators K1 and K2 appropriately and permits the triggering of the switch S2. The voltage required for triggering and thus closing the switch S2 is derived via the voltage divider comprising R6 in series with the parallel circuit of the resistors R5, R7; if both outputs of the comparators K1 and K2 are low, this practical parallel switching of R5 with R7 is effected to 0 or ground potential.

The linking circuit includes the diodes D2 and D3, which are conductive for high, or in other words, positive voltages to the outputs of the comparators K1 and K2 and are applied, with their cathodes connected, to a switch S1 in order to trigger it. Therefore, if the injection duration signal SD or $SD_{eff}$ is high, corresponding to a high output of the comparator K1, then the diode D2 is conductive, and via the switch S1 which is then closed because it has been triggered by this diode D2, the diode D2 directs the triggering for the switch S2 to "low", that is, to ground, the switch S2 being supplied with its triggering function via the resistor R15.

The same occurs if the voltage $U_{S4}$ corresponding with the output voltage of the comparator K2 is at a high level. In that case, the switch S1 is correspondingly triggered via the diode D3 which is in that case conductive. When both outputs of K1 and K2 are at a high level, the diodes D2 and D3 are conductive as well and via the triggered switch S1 they block the closure of the switch S2. Only when both comparator outputs are low, or in other words, there is neither an injection duration signal (that is, the integrator is not integrating downwards) nor is the switch S4 closed for sampling the integrator output signal, are both diodes blocked, and the switch S1 is therefore opened via the resistor R8 leading to ground. The closure of the switch S2 is then effected, as described above, via the voltage derived at the voltage divider R6 having the value R5/R7. The switch S2 remains closed (see the voltage $U_{S2}$ at (h) in FIG. 5) and discharges the capacitor C4 until such time as the next injection duration signal $SD_{eff}$ appears.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for determining the injected fuel quantity ($Q_K$) in internal combustion engines, in particular Diesel engines, comprising the steps of, selecting as operating parameters signals corresponding to the rpm (n) and the injection duration (SD), and linking the signals together for forming an output signal proportional to the injected fuel quantity.

2. A method as defined by claim 1, comprising the further steps of, establishing a performance graph of the dependency of the injection quantity ($Q_K$) on the injection duration (SD) for the engine type, using the rpm (n) as a corrective parameter, and establishing a corrected injection duration signal by shortening the normal injection duration signal (SD) by a predetermined duration prior to signal processing thereof.

3. A method as defined by claim 2, wherein the corrected injection duration signal is linked multiplicatively with an rpm voltage signal (Un).

4. A method as defined by claim 2 or 3, wherein the corrected injection duration signal determines the period of time during which an rpm-proportional voltage value (Un) is supplied for integration to an integrator.

5. A method as defined by claim 4, wherein a constant value is imposed on the voltage value (Un) supplied for integration.

6. A method as defined by claim 2, wherein in the preparation of the performance graph, a fictive zero point (P) is established in the negative injection quantity range.

7. A method as defined by claim 6, wherein the final value of a linearly functioning integrator is stored upon the arrival of the trailing edge of the injection duration signal (SD) and subsequently sampled.

8. An apparatus for determining the injected fuel quantity ($Q_K$) in internal combustion engines, and providing for the injection duration correction upon the evaluation of a performance graph indicating the injection quantity over the injection duration dependent upon the rpm (n) as a parameter for the engine type, comprising, means supplying an injection duration signal (SD) derived from the operation of the engine, an integrator means for the integration of rpm-dependent voltages (Un), and circuit means (12) for correcting the injection duration signal, whereby the integration duration is determined from the corrected injection duration signal.

9. An apparatus as defined by claim 8, wherein the circuit means (12) acts to shorten the injection duration signal (SD) by a predetermined, constant duration and delivers the corrected signal to a switch means (11) for triggering a closing duration, and the switch (11) acts upon the integrator (10) with the rpm voltage (Un).

10. An apparatus as defined by claim 8 or 9, further comprising, a discharge circuit (16) associated with the integrator, and a sample and hold circuit (14) following the integrator, whereby the integrator is discharged whenever upon a terminated corrected injection duration signal the transfer process of the integrator output value to the sample and hold circuit (14) is performed.

11. An apparatus as defined by claim 10, further comprising, a further switch means (13) disposed between the integrator (10) and the sample and hold circuit (14), a multivibrator means (15) connected to the switch means (13), whereby upon the termination of each corrected duration signal the switch means (13) connects the output of the integrator for a predetermined period, determined at a given time by the elapse of the multivibrator means (15), with the input of the sample and hold circuit.

12. An apparatus as defined by claim 11, wherein the circuit means (12) comprises a resistor-capacitor member (R1, C1) having rapid discharge via a diode (D1) poled in the opposite direction and connected with one input of a comparator (K1), the output of which via an electric switch (S3) determines the duration with which the rpm-proportional voltage signal (Un) is switched to the input of the integrator.

13. An apparatus as defined in claim 12 wherein the integrator comprises a Miller integrator (V1, C4).

14. An apparatus as defined by claim 12, wherein the switch means (13) comprises a sampling switch (13, S4) from the output of the integrator (I) to the input of the sample and hold circuit, and further comprising a multivibrator means having an RC member (C3, R12) at the input of a further comparator (K2), to the other input of which a means (R13, R14) supplies a voltage whereby the output of the further comparator (K2) is switched by the trailing edge of the injection duration signal (SD) into its respectively other status for a predetermined period of time in order to trigger the sampling switch (S4) between the integrator and the sample and hold circuit.

15. An apparatus as defined by claim 14, wherein the discharge circuit (16) comprises a capacitor (C4) in the integrator (I) and a continuously triggered switch (S2) having a following ground conductor resistor (R6), a further triggering switch (S3), and a linking circuit means, whereby the triggering voltage for the discharging switch (S2) of the integrator-capacitor (C4) is short-circuited whenever the outputs of the comparators (K1, K2) are at a high level and the further triggering switch (S3) for the rpm voltage (Un) at the integrator I is closed.

16. An apparatus as defined by claim 15, wherein the linking circuit means comprises diodes (D2, D3) switched opposite from one another and each being connected with the outputs of the comparators (K1, K2), whereby the diodes trigger the switch means (11, S1) which short-circuits the trigger signal for the discharging switch (S2).

* * * * *